United States Patent [19]

Wienkop

[11] Patent Number: 5,576,947
[45] Date of Patent: Nov. 19, 1996

[54] ROBOT HALLWAY TRAVELER

[75] Inventor: Uwe Wienkop, Munich, Germany

[73] Assignee: Siemens Corporate Research, Inc., Princeton, N.J.

[21] Appl. No.: 269,298

[22] Filed: Jun. 30, 1994

[51] Int. Cl.⁶ ................................................. G05B 19/18
[52] U.S. Cl. ............................ 364/167.01; 364/424.02; 180/169; 318/568.12
[58] Field of Search ....................... 364/167.01, 424.01, 364/424.02, 443, 447, 449; 180/167–169; 318/568.12

[56] References Cited

U.S. PATENT DOCUMENTS

| | | | |
|---|---|---|---|
| 4,821,192 | 4/1989 | Taivalkoski et al. | 364/424.02 |
| 5,051,906 | 9/1991 | Evans, Jr. et al. | 364/424.02 |
| 5,111,401 | 5/1992 | Everett, Jr. et al. | 364/424.02 |
| 5,307,271 | 4/1994 | Everett, Jr. et al. | 364/424.02 |
| 5,446,356 | 8/1995 | Kim | 364/424.02 |

OTHER PUBLICATIONS

Product Brochure, *Nomadic Technologies, Inc., Mountainview, California*, 9 pages, May, 1993.
Elfes, Alberto; "Sonar–Based Real–World Mapping and Navigation", *IEEE Journal of Robotics and Automation*, vol. RA–3, No. 3, Jun. 1987.
Luo, Ren C.; "Multisensor Integration And Fusion In Intelligent Systems"; *IEEE Transactions on Systems, Man, and Cybernetics*, vol. 19, No. 5, Sep./Oct. 1989.
Borenstein, Johann; "Real–Time Obstacle Avoidance For Fast Mobile Robots"; *IEEE Transactions on Systems, Man, and Cybernetics*, vol. 19, No. 5, Sep./Oct. 1989.
Borenstein, Johann; "The Vector Field Histogram—Fast Mobile Obstacle Avoidance For Mobile Robots"; *IEEE Transactions on Robotics and Automatin*, vol. 7, No. 3, Jun. 1991.
Borenstein, Johann; Koren, Y.; "High–Speed Obstacle Avoidance For Mobile Robots", IEEE O–8196–2012–9/89/00000/038, 1989.
Hackett, Jay K.; Shah, Mubarak; "Multi–Sensor Fusion: A Perspective", *IEEE International Conference on Robotics and Automation*, CH2876–1/90/0000/1324, 1990.

*Primary Examiner*—Roy N. Envall, Jr.
*Assistant Examiner*—Thomas E. Brown
*Attorney, Agent, or Firm*—Adel A. Ahmed

[57] ABSTRACT

A vehicle is guided along a hall by obtaining distances between it and the nearest objects along a plurality of directions, fitting straight lines through the distances to define the walls of the hall, determining its distance from the center of the hall and its angular orientation with respect thereto and directing it to a given point on the center or other line with an angular rotation so that it faces along the center line.

7 Claims, 6 Drawing Sheets

ROBOT HALLWAY TRAVELER

FIELD OF THE INVENTION

This invention is in the field of controlling the path followed by a robot.

BACKGROUND OF THE INVENTION

Robots have now reached a stage of development where they can potentially perform a number of tasks such as mail delivery, security patrol, visitor guidance and looking for leaks. All these tasks require a basic method for directing a robot for specific distances along a hallway as well as ways of detecting junctions and turns. Heretofore, research has been directed to methods for finding a path to a given location in such manner as to avoid obstacles. Information for these purposes has been obtained by sonar sensors. Unfortunately, an obstacle avoidance system is very sensitive to irregularities in the hall such as open doors and fire extinguishers.

SUMMARY OF THE INVENTION

In accordance with this invention, a robot is guided along the center line of a hall, or a line parallel to the center line, in response to information as to the width of the hall and distances at different angles between the robot and the nearest object. The distance information may be derived by sonar sensors on either side of the robot. A least square technique is used to fit straight lines to the said nearest objects on either side of the robot so as to define the distance of the robot from the center line of the hall as well as its angular orientation with respect to the hall. It is then only necessary to effect steering control to bring the robot to the center or other line with a heading directly down the hall.

In carrying out this process, distances that are greater than a given value are eliminated from the calculations. Thus, for example, the larger distance obtained when a sensor beam passes through an open doorway is ignored.

Whereas the sonar beams have a width of about 22.5°, the angular position of the robot is determined with a resolution of 2° or 3° because of the line fitting technique just described.

The position of the robot with respect to a line along a hallway is generally determined from its distance to each wall that is derived from the appropriate distance measurements at different angles, but if one distance is more than the width of the hall, it is not used in deriving the steering control. Thus, for example, the robot continues to move along the center of a hall when a large entryway or lobby is on one side.

When an obstacle such as a drinking fountain is encountered along one wall, the line fitting technique causes that wall to appear to be closer so that the robot is moved away from it.

DETAILED DESCRIPTION OF THE INVENTION

Figure 1:
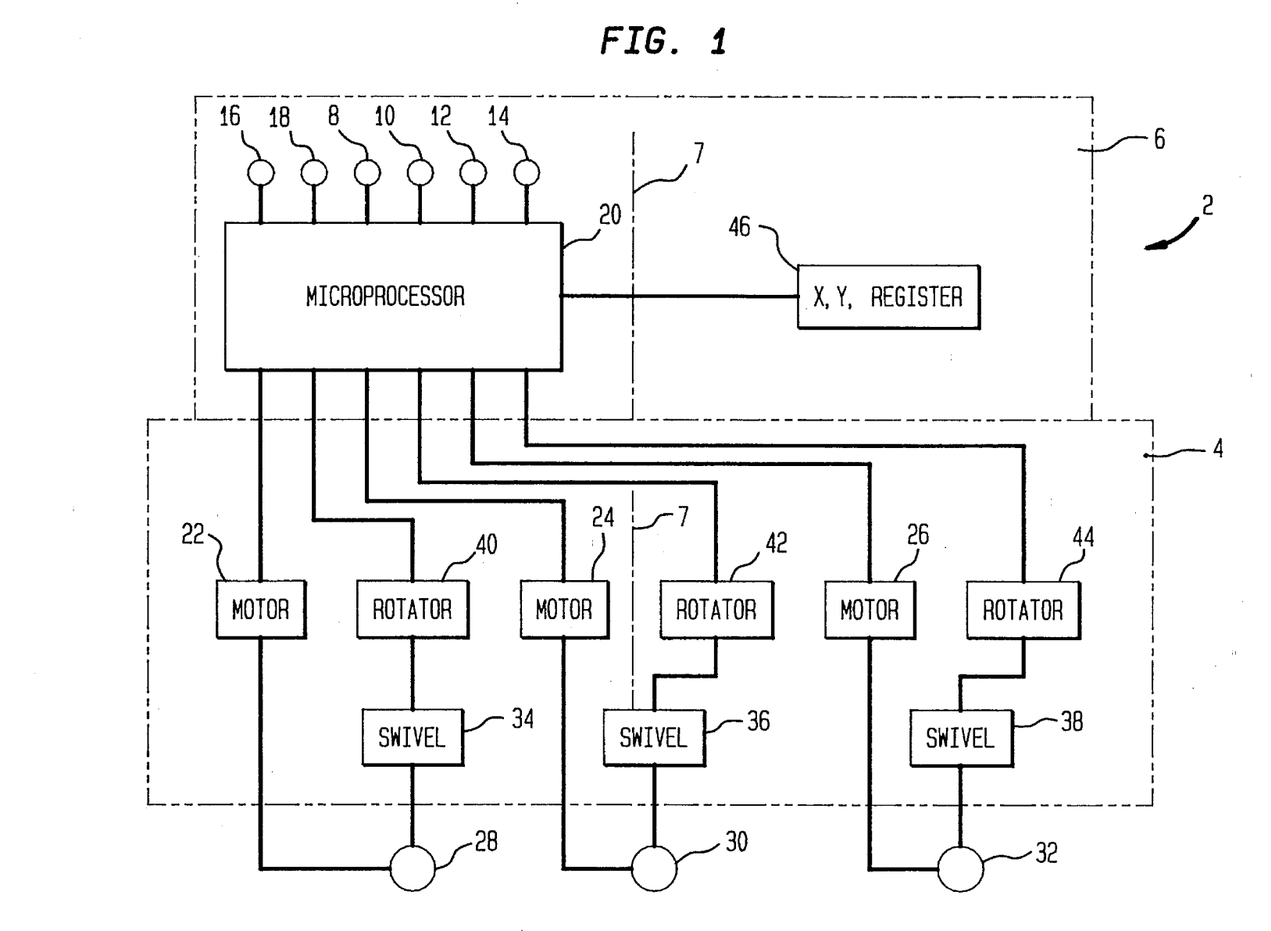
FIG. 1 illustrates the essential components of a robot useful with this invention.
Figure 2:
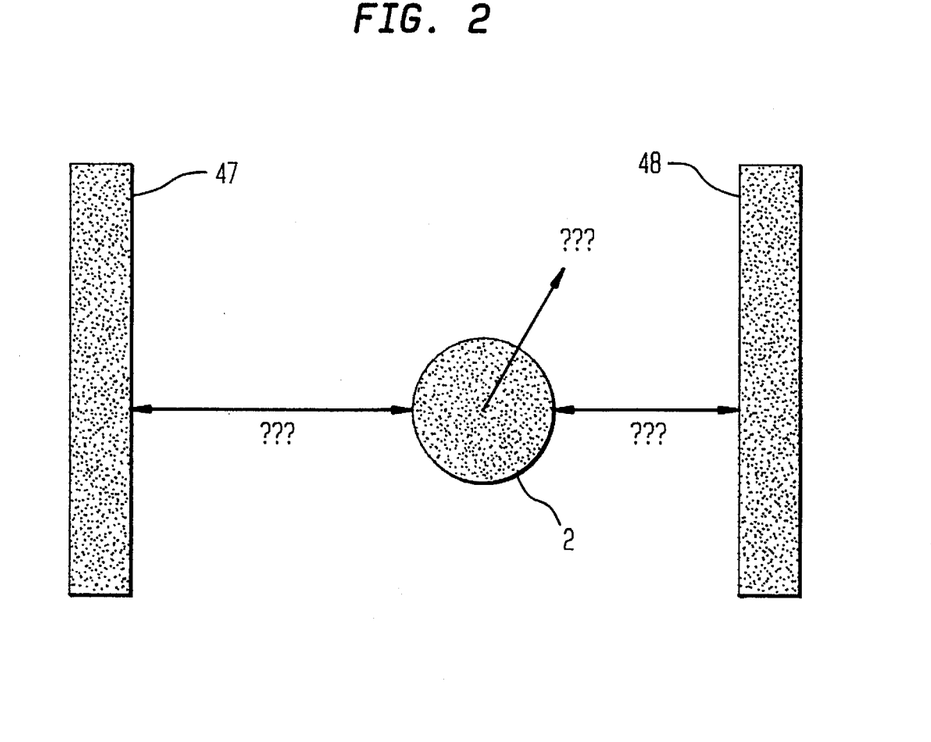
FIG. 2 shows an arbitrary initial position of a robot in a hall.
Figure 3:
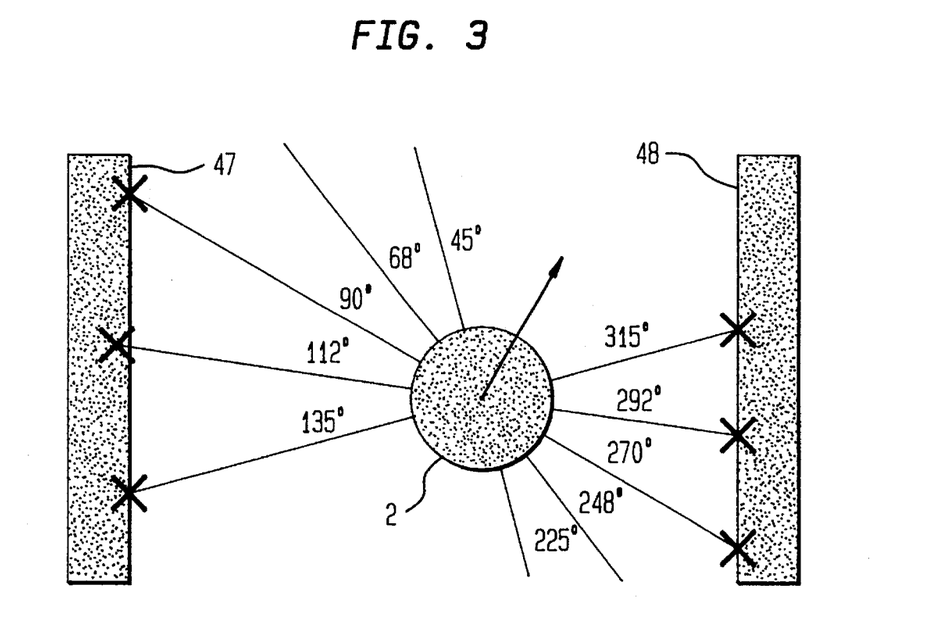
FIG. 3 shows a robot with sensors at five angles on each side with the useable distance measurements being indicated by crosses.

FIG. 1 is a schematic representation of the essential components of a robot 2 with which this invention may be used. A robot 2 called the NOMAD 200 by its manufacturer Nomadic Technologies, Inc., of Mountainview, Calif., was used in an engineering prototype incorporating the present invention. The robot 2 is comprised of a base 4 and a turret 6 mounted for rotation about an axis 7 thereof. A plurality of sonar sensors 8, 10, 12, 14, 16, and 18 are distributed around the turret 6 so as to direct sonar beams at different angles such as shown in FIGS. 2 and 3. A microprocessor 20 supplies signals for energizing the sensors in sequence, derives the distance to the nearest object for each sensor, and performs the line fitting process and signal processing functions. In addition, the microprocessor 20 provides control signals to motors 22, 24, and 26 that respectively drive wheels 28, 30 and 32 that are connected to the base 4 via swivels 34, 36, and 38. The angular direction in which the wheels 28, 30, and 32 are rolling under the control of their respective motors 22, 24, and 26 is due to the action of rotators 40, 42, and 44, respectively, that are controlled by the microprocessor 20. An x, y register 46 indicates the x,y position of the robot 2.

Beside the travel length and the hallway width no other environmental information is supplied to a robot 2 controlled as in this invention. The robot 2 has no information about the number of doors (which may be open or closed), items which are mounted on the walls, e.g. fire extinguishers, items which are stored in the hallway close to the walls, e.g. trash bins, junctions, or people walking by or standing in the hallway.

Another problem comes up with the usage of sonar sensors. Although they have some good features, e.g. low price and good accuracy under proper conditions, they have poor angular resolution. Regular sonar sensors have a resolution of about 20 degrees. This means that if the sensor reports an obstacle at a certain distance, one does not receive more information about the shape or the relative orientation between this obstacle and the robot 2. The method for traveling along a hall therefore has to deal with this special characteristic of sonar as well.

Some robots require steering like (10,5) which means: go 10 cm forward and turn left by 5 degrees (positive angles are always assumed to be left turns and negative angles are right turns). Other robots require more indirect steering by specifying motor velocities like (50,−6) which means: go forward at a speed of 50 cm/s (centimeters per second) and turn right at a speed of 6 degrees/s. This invention can operate with either steering method.

Initially, as indicated in FIG. 2, the robot 2 does not know about the distances to the walls 47 and 48 on both sides, and it does not know the direction it is heading. It is crucial for all steering routines to know these two parameters.

In the first step for obtaining these parameters the robot 2 fires its sonar sensors. This can be done in an arbitrary order and at an arbitrary firing rate with, for example, 8 ms (millisecond) delay between two subsequent sonar firings. It is important for the following steps that the angles of the sonar sensors relative to the robot's forward direction be known. After the distance to the nearest object is derived for each sensor, the microprocessor 20 uses the distance information and each sensor's angle to calculate the position of the nearest object at each angle in world coordinates. Since the robot 2 is assumed to travel in a hall, these coordinates should represent certain positions of the wall on both sides of the robot 2. Due to the inaccuracy of sonar (i.e. noise and partial absorption) these readings may not always match with the actual walls. Although a different firing order can be used, the sensors were fired in this order 10, 8, 18, 12, 16, and 14, wherein the sensor 8 is at the front and the other sensors are numbered in counterclockwise order. Only six sensors are shown in FIG. 1, but better performance is obtained if five sensors are used on either side with an angle of 22° between them as illustrated in FIG. 3.

Figure 4:
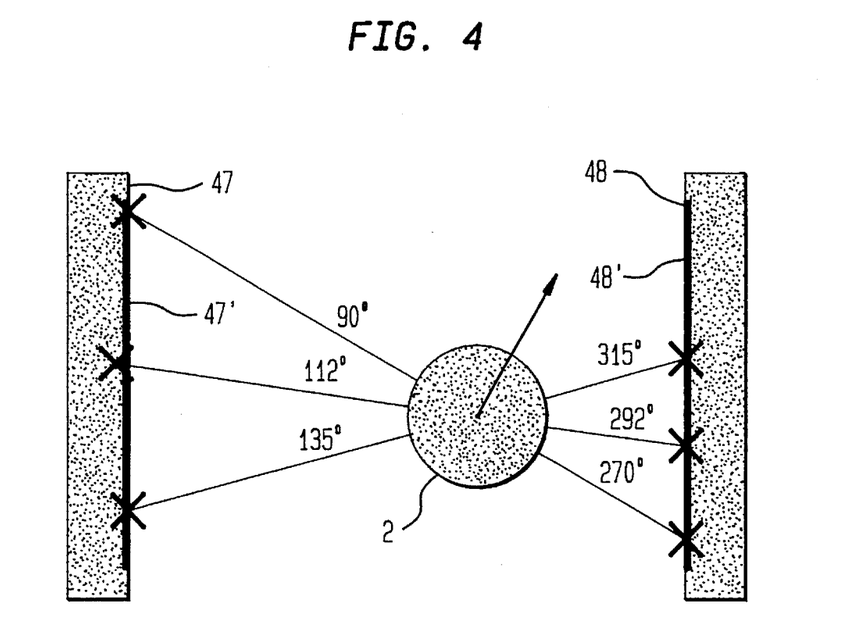
FIG. 4 is like FIG. 3 and shows the straight lines fit to the useable distances.

In the second step, the distances to the nearest objects are filtered in order to get rid of those that are unsuitable. For example, the 45°, 68°, 225°, and 248° sensors in FIG. 3 will report a much longer distance than actually exists due to sonar reflections if the entry angle is too large. Another reason not to take all distances will be found if the hallway is not perfect. This means there might be open doors, fire extinguishers, trash bins, and other irregularities in the hall. This filter step eliminates the effects produced by these things to some extent. This pruning of the sonar readings depends on the width of the hall. In one case, the limits of the sonar distances used in calculating suitable distances were set to 75 inches in a 69 inch wide hallway. In the third step, straight lines 47' and 48' are fit through the acceptable closest objects shown by crosses on both sides of the robot 2 in FIG. 4. Since the walls 47 and 48 of the hall are assumed to be straight (although this does not hold in every case due to the irregularities mentioned above), a straight line through these closest objects gives a good approximation of the robot's angular orientation with respect to the walls. This line fitting approach also overcomes the poor angular resolution of the sonar sensors. If at least three sensors are used to calculate the robot's orientation, a reasonable accuracy of about 2–3 degrees can be achieved.

This line fitting is done using the three formulas below:

$$\text{angle'} = \frac{n \times \Sigma xy - \Sigma x \times \Sigma y}{n \times \Sigma x^2 - (\Sigma x)^2} \quad (1)$$

$$\text{dist} = \frac{\Sigma y - \text{angle'} \times \Sigma x}{n} \quad (2)$$

$$\text{angle} = a\tan(\text{angle'}) \quad (3)$$

The symbols used in the formulas above have the following meaning:

$\Sigma x$ sum of the sonar's x coordinates $\Sigma y$ sum of the sonar's y coordinates $\Sigma xy$ sum of the product of x and y coordinates $\Sigma x^2$ sum of the square of the x coordinates n the number of coordinates used Thus, these equations deliver the robot's distance to the walls on its left and right hand side as well as the robot's angular orientation with respect to the walls. Of course, due to the sonar imperfections and irregularities of the hallway the two lines' angles do not necessarily have the same value. For example, if there is an irregularity on the left hand side, this angle will certainly be different from the angle on the right hand side.

Figure 5:
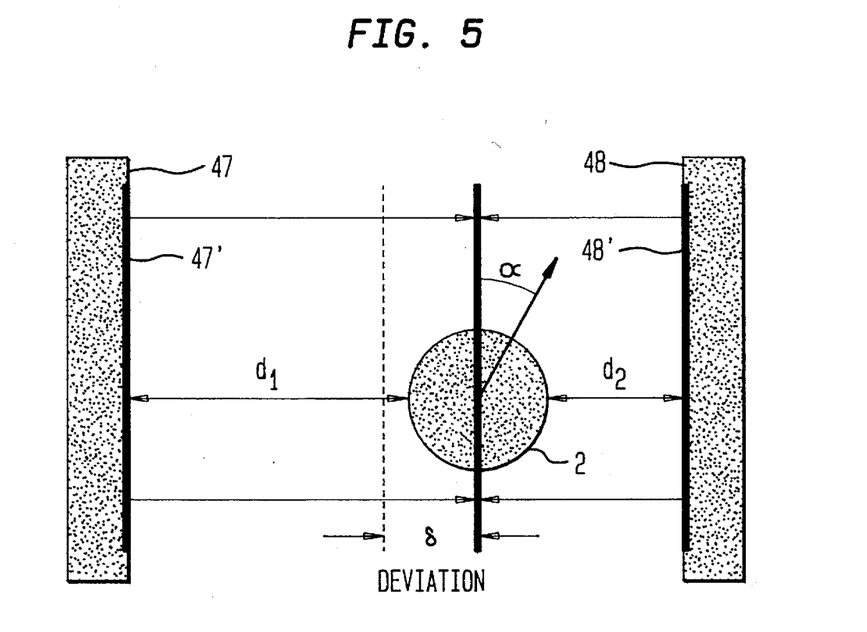
FIG. 5 shows a robot having a heading error α and a deviation δ from the center line.

The fourth step of the hall traveling method is therefore to combine the distance and angle parameters of the lines 47' and 48' in such a way that only the desired information on the robot's deviation δ from the center line and its heading α is left as shown in FIG. 5. This is done by checking whether the distance parameters of each line are within a reasonable range for a hallway of this size. Reasonable parameters should show distances $d_1$ and $d_2$ to the lines 47' and 48', respectively, that are not greater than the hall width. If parameters of both lines 47' and 48' meet this condition, both distance parameters are taken to calculate the robot's deviation δ from the center line of the hallway. This is done by just averaging the two distances $d_1$ and $d_2$. If the distance parameter of one of the lines 47' and 48' does not meet the condition, this line equation is ignored and the known width of the hallway is used as a substitute of this distance information. Although this is rarely the case, it is also possible that both line equations do not show reasonable values. In this case it is assumed that there is a wider gap, and the robot 2 is commanded to go straight at a low speed.

In the fifth step, the angles of the lines 47' and 48' also have to be combined. If both line distance parameter sets have "good" values, the combined robot 2 angular orientation is calculated as the average of the angles of the lines 47' and 48'. If line distance parameter of one line does not meet the condition, then only the remaining "good" angle is taken. After this step, the robot's deviation δ from the center or other line and its angular orientation in the hallway are known. Due to the chosen angles of the sonar sensors, a deviation to the right hand side of the center line has a negative and a deviation to the left hand side has a positive value. Likewise a robot's heading to the right hand side of the hallway has a positive and a heading to the left hand side a negative angle.

Figure 6:
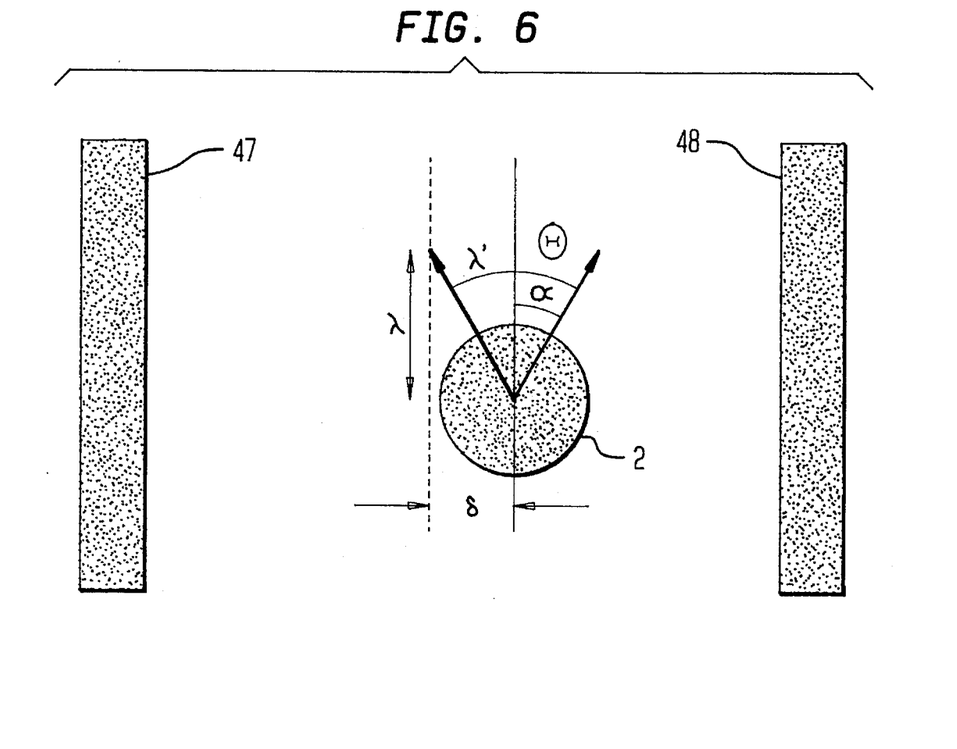
FIG. 6 shows the steering angle θ that is used to move the robot having a deviation δ and a heading error of α to the center line in a distance λ'.

For the calculation of the steering angle θ illustrated in FIG. 6, it is necessary to know how fast, i.e. within what distance along the hall a deviation and a wrong angular orientation should be corrected. The distance λ chosen here is very crucial for the robot's steering behavior. If a very short distance is chosen, then deviations will be corrected almost immediately, but this leads to rapid steering changes, and if the robot 2 overshoots its trajectory correction just a little bit, it will tend to move in a zig-zag style along the center or other line. But if the chosen distance is too large, it will take too long to return to the center or other line. It is therefore necessary to find a "good" number for the distance. In experiments the best distance λ turned out to be 10 inches.

The following formulas are used to calculate the new steering angle θ from the information gathered so far:

$$\beta = a\cos\left(\frac{|\delta|}{\lambda'}\right) \quad (4)$$

$$\theta = \begin{cases} 90 + \alpha - \beta; & (\delta > 0) \\ \alpha + \beta - 90; & (\delta \leq 0) \end{cases} \quad (5)$$

$$\lambda' = \sqrt{\lambda^2 + \delta^2} \quad (6)$$

The only thing left is to apply this steering angle by initiating a relative_move(λ', θ); i.e. turn by θ degrees and move forward the distance λ'. If the robot 2 requires velocity moves, a command velocity move(λ', θ) is provided in which the robot 2 moves a distance λ' at a given speed and changes its angular reading at a given number of degrees a second. Although these two modes usually do have a very different behavior, the described method works in both modes. The parameters for the velocity_move may have to be modified by multiplying certain factors to adjust the angles with the actual speeds which are supported by the specific robot 2.

Since the line fitting and calculation of the deviation δ of the robot 2 from the center of the hall and its angular orientation only take a short time, they can be done numerous times as the robot 2 approaches the centerline.

Assume that the x, y registers 46 indicate the robot's current x/y position to be rob_x and rob_y. While the robot 2 is moving, these registers will be updated accordingly. If the initial value of the x/y registers are saved at the beginning of the hallway traveling task, it will then be very easy to keep track of the distance the robot has already travelled along using the Euclidean distance equation. Let us assume the initial x/y values are saved in the two variables start_x and start_y. The overall control loop (written in C-Code) turns out to be:

```
start_x = rob_x;
start_y = rob_y;
while    (sqrt(sq(rob_x – start_x) +
              sq(rob_y – start_y))
         < to_go_distance)
    theta = calculate_steering_angle( );
    move_robot(theta);
```

The function calculate_steering_angle is the steering method which was previously described, and the move_robot 2 function is a function which executes one move step of the robot 2. It is assumed that the robot's x/y registers (rob_x and rob_y) and the sonar readings will be updated after each move step.

The actual move can be executed in two ways. The move_robot 2 function may invoke a robot 2 routine, which commands the robot 2 to turn and to move. It is now possible for the move_robot 2 routine just to wait until this function finishes and then to return.

However, if the robot 2 routine runs parallel to the control program explained supra and it has the ability to be interrupted at any time later on, then it is also possible just to pass the steering angle theta to this robot 2 function, ask for the current x/y status and the sonar readings, and to return after a short delay almost immediately.

In this case, the whole process of calculating steering angle and executing the move_robot 2 routine will start over and over again even though no single move_step was really finished. This style is more like a human driving. Whenever a deviation from the commanded path is detected, the program calculates the angle by which the robot 2 has to turn to go back to the center line. But during returning to the center line the robot 2 still keeps sensing for its orientation and it will correct its trajectory if necessary. This style of robot 2 programming turns out to be very effective and it leads to smooth operations.

However, both methods of robot 2 programming work very well and are reliable.

In any event, once the robot 2 reaches the center or other line, its heading must be changed to a direction along the hall.

Figure 7:
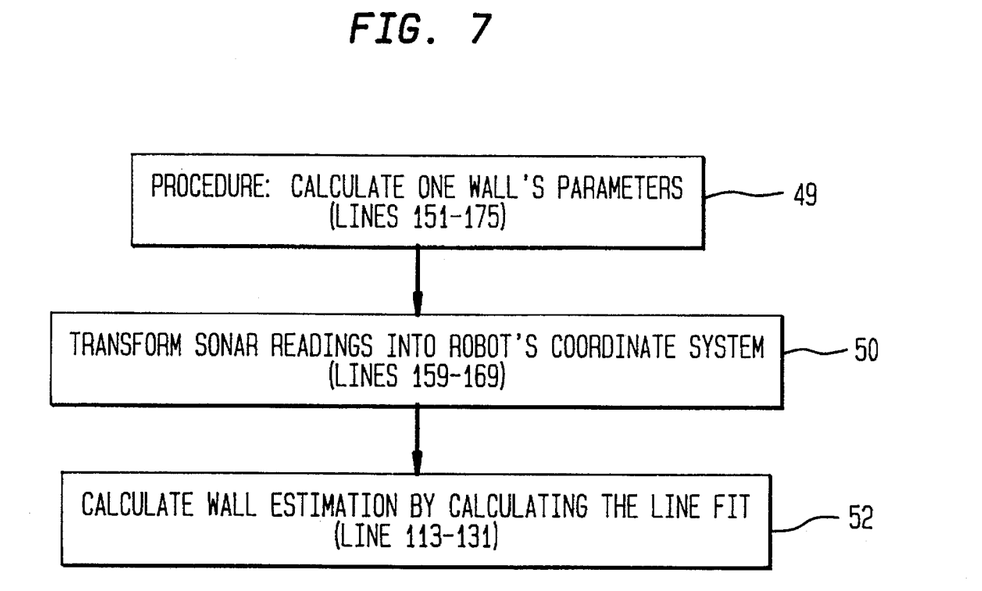
FIG. 7 is a flowchart illustrating the fitting of a line to one set of closest objects.

Reference is made to FIG. 7 for an illustration of a procedure for calculating the parameters of one wall. As indicated in a block 49, the program lines 151–175 of the program are set forth in the program table at the end of this "Detailed Description Of The Invention". In a step 50 the sonar readings are transformed into the robot's coordinate system by use of the lines 159–169, and a step 52 indicates that the lines 113–131 are used in calculating the line fit.

Figure 8:
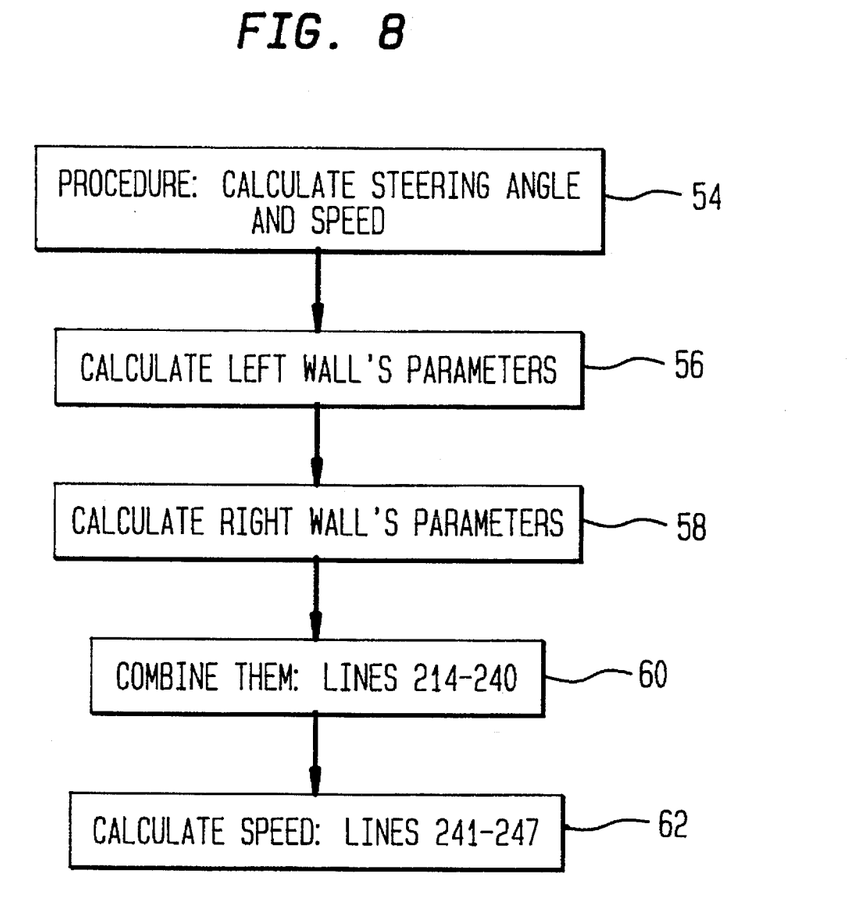
FIG. 8 is a flowchart illustrating the calculation of steering are and speed.

FIG. 8 shows the calculation of steering angle θ and speed as called for in a block 54. As indicated at a step 56, the procedure of FIG. 7 is used to calculate the left wall's parameters, and, as indicated in step 58 the procedure of FIG. 7 is also used to calculate the right wall's parameters. A step 60 indicates that program lines 214–240 of the table are used to combine the parameters of the left and right walls, and a step 62 states that program line 240–247 are used in calculating speed.

Figure 9:
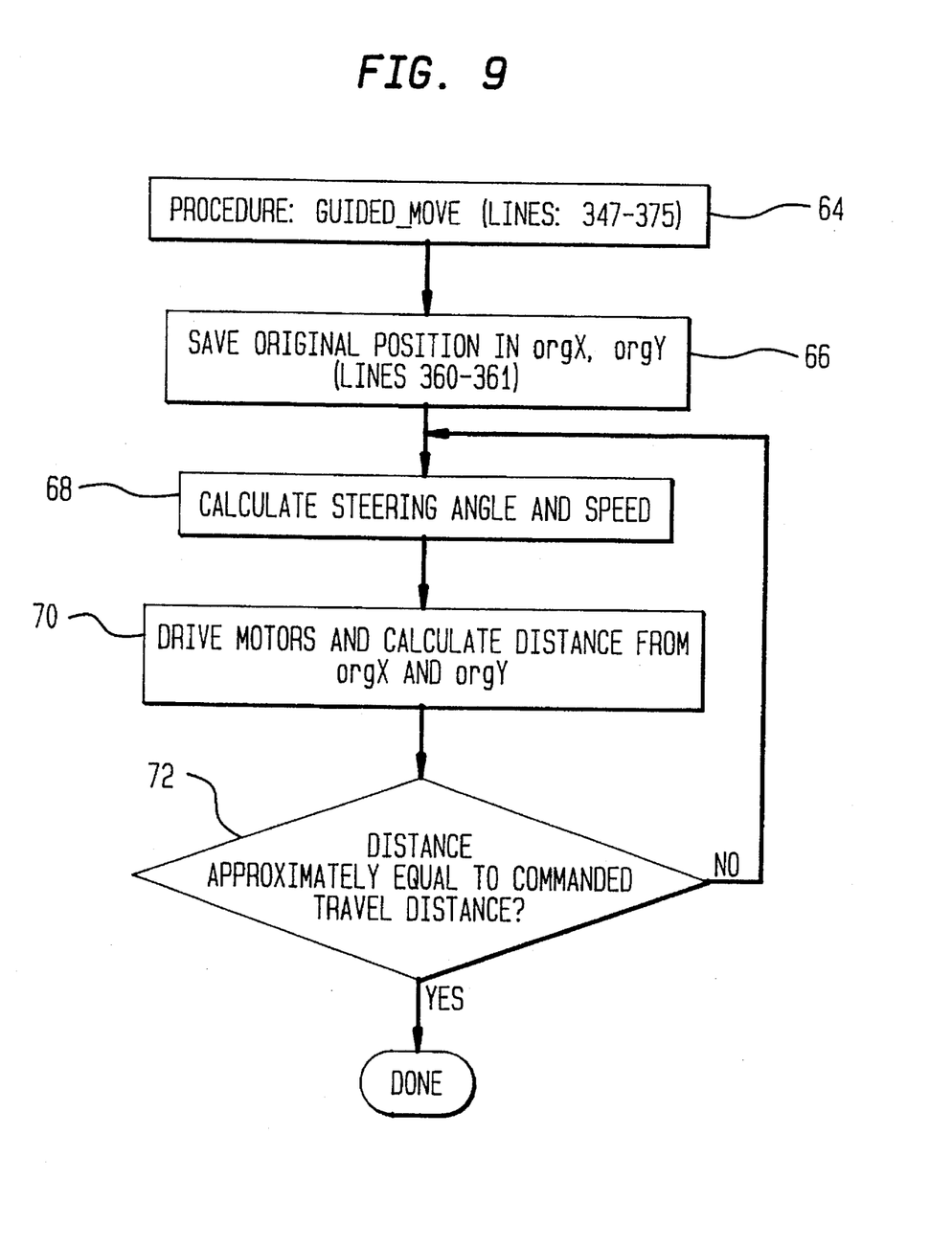
FIG. 9 is a flowchart for guiding the robot and determining when it has traveled an assigned distance.

A block 64 in FIG. 9 indicates that program lines 347–375 of the table are used in the guided move procedure. The original x, y position of the robot 2 is saved in step 66 by using program lines 360–361 of the table. A step 68 indicates that the steering angle θ and speed are calculated as indicated in FIG. 8.

In a step 70, the motors are driven and the distance from the starting x, y position is calculated, and in a decision step 72 a check is made to see whether or not the distance determined in the step 70 equals the distance the robot 2 is to move. If not, the procedure goes back to the step 68, but if so, everything has been done.

Although it is preferable to use sensors on both sides of the robot 2 as has been described, the method of the invention can be carried out with sensors on one side. In this case, the position of the wall on that side is defined by the line fitting technique described, and the distance from the wall and the angular orientation with respect to it are calculated. The steering angle θ required to return the robot 2 to a given line along the hallway is calculated in the same way.

ROBOT MOVEMENT ROUTINES SOURCE CODE
IN "C" LANGUAGE

```
****************************************************************
**
****************************************************************
**
**
**      VERSION:  1.0
****************************************************************
**      DESCRIPTION:
**      This file contains different kinds of robot move
**      routines for hallway following. The desired move
**      method is selected by the TravelMode Flag.
****************************************************************
**
**
**              |         |
**              |         |
****************************************************************

/*****************   INCLUDE FILES    *********************
#include "Nclient.h"
#include <math.h>
#include <stdio.h?

/***************   DEFINITIONS      ******************* define    PI 3.14159265358979323846
define    RTD(x)        ((x)*(180.0/PI))
#define    DTR(a)        ((a)*(PI/180.0))
#define    SQ(x)         ((x)*(x))
#define    THRES         75
#define    STEP 35
#define    STDSPEED      75
#define    MAXSTEER      180
#define    WAIT(t)       usleep ((unsigned int) ((t)*1000))
#define    DEBUG(cmd)    if (DebugMode)  {cmd;}
#define    TFACTOR       1.05
#define    GO_STRAIGHT   0
#define    TURN_LEFT     1
#define    TURN_RIGHT    2
#define    MAX(x,y)      ((x) > (y) ? (x) : (y))
#define    MIN(x,y)      ((x) > (y) ? (y) : (x))

/***************   FUNCTION DEFINITIONS    ******** void SideEffects(void);
```

-continued
ROBOT MOVEMENT ROUTINES SOURCE CODE
IN "C" LANGUAGE

```
/*************** VARIABLES ********************** extern File       *out;
extern char       TravelMode;
extern char       DebugMode;

int               StopGoDist = 197;    /* this equals 50 cm    */
int               offCenter;           /* off the center line
*/
int               TravelDist;          /* achieved distance    */
                                       /* in mm units          */
float             Orientation          /* in degrees           */ static float      xSens [16], ySens[16];
static int        IR_calibration [16] =
{ 0, 1, 2, 3, 3, 4, 4, 4, 5, 6, 8, 9, 11, 13, 17, 24};

/************************************************************
**      FUNCTION_NAME   init_xy_Sens
*************************************************************
**      INPUT:none
**      OUTPUT:none
**      REMARKS:initializes the transformation tables to
**              translate a sonar or infrared reading to a
**              position in space
*************************************************************/
init_xy_Sens( )
{
        float     a;
        int       i=0 for (a=0;    a<6.283;   a+= 0.3927)
        {
                xSens[i] = (float)   cos(a);
                ySens[i] = (float)   sin(a);
                i++;
        }
}

/************************************************************
**      FUNCTION_NAME   calc_ab
*************************************************************
**      INPUT:a number 'n' which represents the number of
**              readings been stored in the arrays x and y
**      OUTPUT:this function delivers a distance and an
**              angle relative to the wall
**      REMARKS:Essentially this function calculates a
**              linear regression of the input data, i.e.
**              it tries to put a straight line through
**              these coordinates.
*************************************************************/
static void calc_ab(n, x, y, dist, angle)
int             n;
float           x[ ], y[ ]
float           *dist, *angle;
{
        float den, Sxy=0, Sx=0, Sy=0, Sx2=0;
        int   i;

for   (i=0;i<n;i++)  {
                Sx    += x[i];
                Sx2   += x[i]*x[i];
                Sy    += y[i];
                Sxy   += x[i]*y[i];
        }

*angle = (float)     (n*Sxy–Sx*Sy)   /  (float)
                             (n*Sx2–SQ(Sx));
        *dist = (Sy – *angle*Sx)   /   n;
        *angle = (*angle == 0.0)   ?   0.0 :  atan(*angle);
}

/************************************************************
**      FUNCTION_NAME   calc_DA
*************************************************************
**      INPUT:two variables start and end which represent
**              the sensor range which should be used to
**              calculate the distance and the angle
**              relative to the wall
**      OUTPUT:the variables Distance and Angle are updated.
**              this function returns (1) on success and
**              (0) if no calculation was possible
**      REMARKS:calc_DA stands for calculate the distance
**              and the angle relative to the wall.
**
*************************************************************/
static int calc_DA (start,end,  Dist,  Angle)
int             start,end;
float           *Dist,*Angle;
{
        float     x[6],y[6];
        int       i,n,reading;

n=0,
        for  (i=start;   i<=end;  i++)
        {
                reading = NOMAD_SONAR(i)+9;
                if (reading<THRES)
                {
                        x[n] = xSens[i] * reading;
                        y[n] = ySens[i] * reading;
                        n++;
                }

}
        if   (n<2)
                return 0;
        calc_ab(n,x,y,   Dist,Angle);
        *Angle = RTD(*Angle);
        return 1;
}

/************************************************************
**      FUNCTION_NAME   calc_theta
*************************************************************
**      INPUT:Flags Left and Right which indicate whether
**              the robot should take the reading from
**              that wall into account
**      OUTPUT:the variables theta and speed are updated to
**              a new steering angle and a new speed
*************************************************************/
static void calc_theta(Left,  Right,theta,speed)
int     Left,Right,         *theta,*speed;
{
        float           AngleL, AngleR, DistL, DistR;
        float           Alpha, Beta, off;

DistL   =       99.9;
        DistR   =       –99.9;
        if (Left)       {
                Left = calc_DA( 2, 6, &DistL, &AngleL);
                if  (DistL > 65)
                        Left = 9;
        }
        if  (Right)     {
                Right = calc_DA(10,14, &DistR, &AngleR);
                if  (DistR < –65)
                        (Right = 0;
        }
```

-continued
ROBOT MOVEMENT ROUTINES SOURCE CODE IN "C" LANGUAGE

```
        DEBUG(printf("%d/%d  %4.1f/%4.1f
                     ",Left,Right,DistL,DistR));
        if  (!Left  &&  !Right) {
            *theta = 0;
            *speed = 20;
            return;
        }
        else    if  (!Left)   {
                    off     = 34.5+DistR;
                    Alpha   = AngleR;
        }
        else    if  (!Right)  {
                    off     = DistL-34.5;
                    Alpha   = AngleL;
        }
        else    {
                    off     = (DistL+DistR) / 2.0;
                    Alpha   = AngleL+AngleR) / 2.0;
        }

DEBUG (printf("d:%5.1f off: %5.1f a: %5.1f ",
                (DistL < 99.0 && DistR > -99.0) ? DistL-DistR :
99.9,
                off,Alpha));
        offCenter   = (int)      (off * 25.4);
        Orientation = Alpha;
        if  (off >   STEP)
                off =    STEP;
        if  (off <   -STEP)
                off =    -STEP;
        Beta = RTD (acos(fabs(off)/STEP));
        if (off > 0.0)
                *theta = (int)    (10.0*(90.0+Alpha-Beta));
        else
                *theta = (int)    (10.0*(Alpha+Beta-90.0));
        Alpha = MAX(abs(*theta)/20.0,fabs(off));
        *speed = (int)    (230.0 - SQ(Alpha));
        if  (*speed > 200)
                *speed = 200;
        if  (*speed < STDSPEED)
                *speed = STDSPEED;
        *theta = *theta / 2;
}

/*************************************************************
**        FUNCTION_NAME  move
**************************************************************
**        INPUT:a togo distance, a travel speed, and a rotation
**                speed.
**                These parameters are also used for the stop
**                and go move.
**                There the rotation speed represents an angle.
**                In that mode the travel speed isn't used at all
**        OUTPUT:none
**        REMARKS:This function also handles a very simple
**                 obstacle recognition. If an obstacle is
**                recognized the robot will slow down and
**                eventually stop in front of the obstacle,
**                give a message, and wait until the obstacle
**                has passed by
*************************************************************/
```

-continued
ROBOT MOVEMENT ROUTINES SOURCE CODE IN "C" LANGUAGE

```
static void move(int togo, nt speed, int theta, char
Left, char Right)
{
        int   blocked, FrontSonar,FrontIR, LastTheta;

blocked = 0;
        do {
                FrontSonar = MIN(NOMAD_SONAR(0)-17,
2*MIN(NOMAD_SONAR(1),NOMAD_SONAR(15))-34);
                /* FrontIR = MIN(NOMAD_IR(1),
                        MIN(NOMAD_IR(1),NOMAD_IR(15));
                   if  (FrontIR < 15)
                        FrontSonar = 0;   */
                DEBUG(printf("*%3d* ",FrontSonar));
                if  (FrontSonar < 50 && FrontSonar < speed)
                        speed = FrontSonar;
                DEBUG(printf("Th:%5.1f
S:%3d/n",theta/10.0,speed));
                if  (speed > 10)
                {
                        if  (TravelMode == 'C')
                        {
                                if  (togo < 50)
                                        speed=50;
                                vm(speed, theta, theta);
                        }
                        else
                        {
                                if  (togo > StopGoDist)
                                        togo = StopGoDist;
                                pr(togo, theta, theta);
                                while (NOMAD_TR_VEL == 0)
                                        gs( );
                                while (NOMAD_TR_VEL != 0||
                                        NOMAD_TH_VEL != 0||
                                        NOMAD_TU_VEL != 0   )
                                        gs( );
                        }
                }
                else
                {
                        DEBUT(printf("## %3d %3d %3d %3d %3d
%3d##",
                                NOMAD_SONAR
(0),NOMAD_SONAR(1),NOMAD_SONAR(15),
NOMAD_IR(0),NOMAD_IR(1),NOMAD_IR(15));
                        if  (!blocked)
                        {
                                tk("Please don't block my way");
                                blocked = 1;
                        }
                        vm(0, theta, theta);
                        LastTheta = theta;
                        calc_theta(Left, Right, &theta, &speed);
                        if  (theta == LastTheta)
                                theta = 0;
                }
        } while (FrontSonar <= 10);
        if (blocked)
                tk("Thank you");
}
```

-continued
ROBOT MOVEMENT ROUTINES SOURCE CODE
IN "C" LANGUAGE

```
/****************************************************************
** FUNCTION_NAME  guided_move
****************************************************************
** INPUT:a distance to be travelled and two flags (Left
**              and Right) which indicate whether the
**              robot should use the left or the right or
**              both walls for orientation. These flags
**              are only used during sonar navigation.
**              The parameter DoAfter tells the move
**              routine what should be done after the
**              routine has finished. This is used to
**              look for specific features in world to
**              determine the correct end of this routine,
**              i.e. a junction on the left where the
**              robot should turn into.
** OUTPUT:This function returns (1) on success and (0)
**              if the robot has hit a wall
****************************************************************/
int   guided_move(gDist,Left,Right,DoAfter)
int   gDist,Left,Right,DoAfter;
{
        int         orgX, orgY;
        int         x, y, achieved, togo;
        int         theta = 0, speed=STDSPEED;
        DEBUG(printf("\n\nMove (%s)\n\n",
        (Left && Right) ? "Left & Right" : (Left) ? "Left"
:"Right"));    tk("Move");
        if (gDist == 0)
              return (1);

orgX =      NOMAD_X;
        orgY =      NOMAD_Y;
        sp(100,200,200);
        achieved    = 0;
        do   {
              togo         = gDist-achieved;
              DEBUG(printf("D: %4d ",togo));
              if (togo < 10)
                    break;
              move(togo, speed, theta, Left, Right);
              achieved = sqrt((double)  (SQ(NOMAD_X-orgX) +
SQ(NOMAD_Y orgY)));
              TravelDist = achieved * 2.54 * TFACTOR;
              calc_theta(Left, Right, &theta, &speed);
        } while (1);
        return 1;
}
```

Although various embodiments of the present invention have been shown and described herein, they are not meant to be limiting. Those of skill in the art may recognize certain modifications to these embodiments, which modifications ar meant to be covered by the spirit and scope of the appended claims.

What is claimed is:

1. A method for guiding a vehicle along a hall having a given width, comprising the steps of:

obtaining distances between the vehicle and the nearest objects in a plurality of directions from both sides of the vehicle;

identifying the nearest objects that are at distances not greater than the width of the hall;

fitting straight lines through the objects thus identified on each side of the vehicle so as to define the positions of the walls;

determining the distance between the vehicle and each of said straight lines;

finding the average of the distances between the vehicle and each of said straight lines to determine the location of the center of the hall;

deriving the deviation of the vehicle from the center of the hall from the difference between said average and one half the width of the hall;

determining the angle between the heading of the vehicle and each of said straight lines; and using an average of said angles as the heading of the vehicle with respect to the center line of the hallway; and controlling the movement of the vehicle in response to said deviation and the average of said angles.

2. A method as set forth in claim 1, further comprising the steps of:

substituting the width of the hallway for the distance between the vehicle and a straight line that exceeds the width of the hall.

3. A method as set forth in claim 1, further including the steps of:

stopping the procedure if the distance between the vehicle and both straight lines exceeds the width of the hallway; and moving the vehicle in its current direction.

4. A method as set forth in claim 3, further comprising the step of:

reducing the speed of the vehicle.

5. A method as set forth in claim 1, further comprising the step of:

substituting the angle between the heading and one of said straight lines for the average of the angles if the distance between the vehicle and the other straight line exceeds the width of the hallway.

6. A method as set forth in claim 1, wherein the step of controlling the movement of the vehicle is effected by turning the vehicle by an angle θ and moving forward a distance λ', wherein equations used are as folows:

$$\theta = 90 + \alpha - \beta; (\delta > 0);$$
$$= \alpha + \beta - 90; (\delta \leq 0);$$
$$\beta = a\cos\left(\frac{|\delta|}{\lambda}\right);$$
$$\lambda' = \sqrt{\lambda^2 + \delta^2} \text{ and}$$

wherein α is the heading of the vehicle, λ is the distance along the center line at which the vehicle is to be on the center line with a heading along the center line, and δ is the vehicle's deviation from the center line.

7. A method as set forth in claim 1, wherein the step of controlling the movement of the vehicle is effected by moving the vehicle at a translational velocity proportional to λ', and a rotational velocity proportional to θ wherein:

$$\theta = 90 + \alpha - \beta; (\delta > 0);$$
$$\text{or}$$
$$= \alpha + \beta - 90; (\delta \leq 0);$$
$$\beta = a\cos\left(\frac{|\delta|}{\lambda}\right);$$
$$\lambda' = \sqrt{\lambda^2 + \delta^2}$$

wherein α is the heading of the vehicle, λ is the distance along the center line at which the vehicle is to be on the center line with a heading along the center line, and δ is the vehicle's deviation from the center line.

* * * * *